E. D. N. SCHULTE.
COMPUTING RULE.
APPLICATION FILED APR. 11, 1912.
1,145,706.
Patented July 6, 1915.
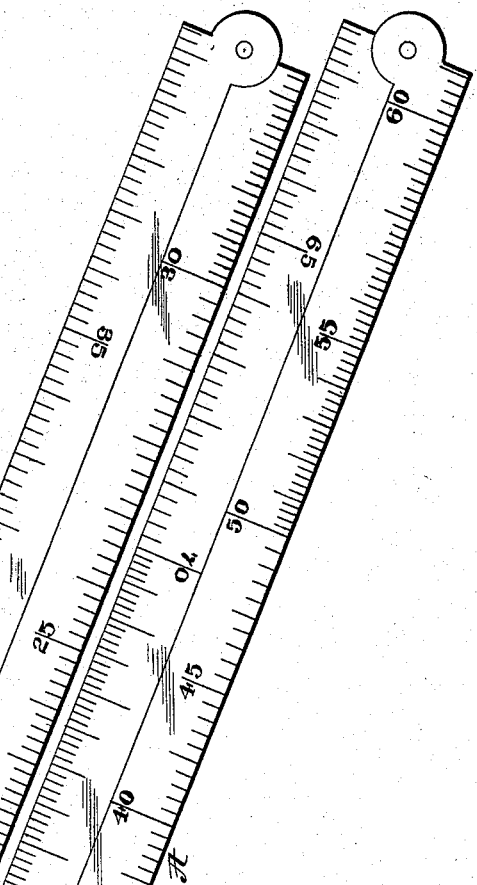
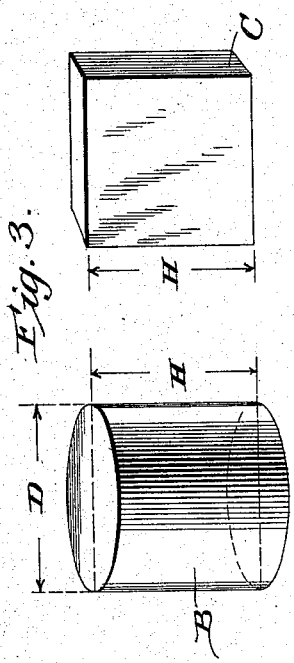
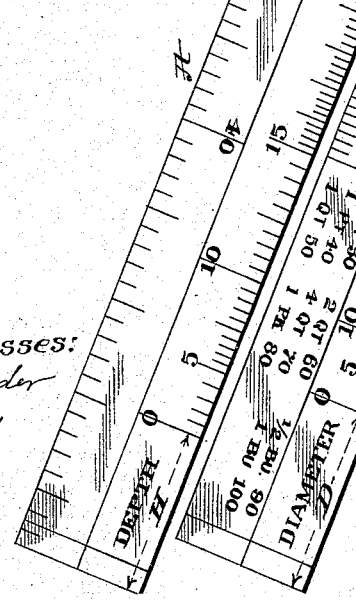
Inventor:
Edward D. N. Schulte,
By
Attorneys.

UNITED STATES PATENT OFFICE.

EDWARD D. N. SCHULTE, OF TROY, NEW YORK, ASSIGNOR TO W. & L. E. GURLEY, A CORPORATION OF NEW YORK.

COMPUTING-RULE.

1,145,706.  Specification of Letters Patent.  Patented July 6, 1915.

Application filed April 11, 1912.  Serial No. 690,144.

*To all whom it may concern:*

Be it known that I, EDWARD D. N. SCHULTE, a citizen of the United States, residing at Troy, in the county of Rensselaer and State of New York, have invented certain new and useful Improvements in Computing-Rules, of which the following is a specification.

This invention relates to computing devices and particularly to a logarithmic rule adapted to be used for the measurement of either rectangular or cylindrical volumes and particularly intended for the use of sealers of weights and measures in testing volumetric measures.

I illustrate a rule embodying the features of my invention in the accompanying drawings in which—

Figure 1 shows the graduations of that side of the rule intended for the measurement of the diameter of cylindrical measures; Fig. 2 shows the graduations of that side of the rule intended for the measurement of the altitude of cylindrical measures or the three dimensions of rectangular measures; and Fig. 3 is intended to illustrate the relative proportions of the units of cubic and cylindrical volume upon which the graduation of this particular rule is based.

It follows from the fundamental principle of logarithms that if a scale be graduated in spaces proportional to the logarithms of any system and the three dimensions of a rectangular solid be read on said scale, then the sum of the three readings will be the logarithm of the volume of the solid. It is to be noted that since log. 1=0, if the unit of volume is to be, for instance one cubic inch, the zero graduation of the logarithmic scale will be one inch from the end of the rule. The positions of the other graduations are then solely dependent on the system of logarithms used, and obviously any convenient system or "base" might be used. Similarly two scales might be devised for conjoint use, one graduated according to the logarithms of a lineal unit and the other according to the logarithms of the areas of circles expressed in terms of the diameter as represented by the formula $$\log\left(\frac{\pi d^2}{4}\right),$$

where $d$=diameter. By measuring the diameter of a cylinder with the diameter scale and its altitude with the lineal or depth scale and adding the two readings we will secure the logarithm of the volume of the solid. To secure this result however, the units of graduation of the two scales must be properly correlated according to the following principles. If the unit of volume is to be for instance $\frac{1}{16}$ pint, a unit which I prefer for reasons later to be explained, choose a cylinder of this volume having any convenient ratio of altitude to diameter. Remembering that log. 1=0 it is obvious that the zero of the lineal scale will be distant from the end of the rule by an amount equal to the altitude of the cylinder and that the zero of the diameter scale will be distant from the end of the scale by an amount equal to the diameter of the cylinder. Other graduations are determined according to the system of logarithms used.

Heretofore scales embodying these general principles have been made and used, but the ratio of the altitude to the diameter of the unit volume cylinder has been chosen at random and the result is that the lineal scale is useless except for the measurement of the altitudes of cylinders in connection with its corresponding diameter scale.

My invention consists in so proportioning the cylindrical unit volume that the lineal or depth scale may be used also to measure the three dimensions of rectangular measures thus imparting a new and useful function to the rule. To effect this result I choose a cylindrical unit volume whose altitude is equal to the edge of a cube of the same volume. From this it follows that the zero of a lineal scale for measuring rectangular volumes and the zero of a lineal scale for measuring altitudes of cylinders would be placed the same distance from the end of the rule and as this distance is the controlling factor in the graduation it follows that the two scales would be identical.

A further feature of my invention is the logarithmic graduation of the rule according to a system having such a base that log. 2=10, and for which the units of depth and diameter are derived from a cylinder of the special proportions above stated having a volume of $\frac{1}{16}$ pint.

The particular desirability of these last features arises from the following facts.

There are 64 pints in a bushel so there are 1024 of the standard units in a bushel.
Now
$$1024 = 2^{10}$$
Then
$$\log. 1024 = 10 \log. 2$$
but
$$\log. 2 = 10$$
Hence log. 1024 = 100 = log. of the number of $\frac{1}{16}$ pint units in 1 bu.

Similarly since log. 2 = 10 log. of the number of $\frac{1}{16}$ pint units in 1 pk. = 80. Log. of the number of $\frac{1}{16}$ pint units in 1 qt. = 50, etc. Consequently the various ordinary units of volume have designations in multiples of ten and are readily remembered.

The length of the unit of depth H may be determined as follows:
$$1 \text{ bu.} = 2150.42 \text{ cu. in.}$$
$$\frac{1}{16} \text{ pt.} = \frac{2150.42}{1024} \text{ cu. in.}$$
$$H = \sqrt[3]{\frac{2150.42}{1024}} = 1.2806 \text{ in.}$$

The unit diameter D may be found as follows:
$$\frac{\pi D^2}{4} = 1.2806^2$$
$$D = 1.4450$$

The value of the standard units of depth and diameter and the logarithmic base being determined as above the positions of all the graduations of the rule may be calculated individually by using the formula derived below.

If $n$ is the base of our system of logarithms
$$\log._n 2 = 10$$
$$K \log._{10} 2 = \log._n 2 = 10$$
$$0.30103 K = 10$$
$$K = 33.220$$

Hence common logs. may be reduced to the new system by multiplying by 33.220.

To derive the distance $y$ to any graduation to be numbered $x$ on the scale for measuring depths
$$x = \log._n y$$
where $y$ is expressed in terms of the lineal unit 1.2806 in.

Converting to common logs. and inches
$$x = K \log._{10} \frac{y}{1.2806}$$
$$x = 33.220 \log._{10} \frac{y}{1.2806}$$
$$x = 33.220(\log._{10} y - \log._{10} 1.2806)$$
$$\log._{10} y = \frac{x}{33.220} + \log._{10} 1.2806$$

Similarly to calculate the distance $s$ to a graduation marked $t$ on the scale for measuring diameters.
$$t = \log._n \left(\frac{\pi s^2}{4}\right)$$
where $s$ is expressed in terms of the unit D.

Converting to common logs. and inches
$$t = K \log._{10} \left[\frac{\pi}{4}\left(\frac{s}{1.2806}\right)^2\right]$$
or simplifying
$$\log._{10} s = \frac{1}{2}\left(\frac{t}{33.220} + .31973\right)$$

When these two series of graduations have been computed they may be suitably engraved on or impressed into the opposite sides of rules, such for instance as the folding rule A shown in the drawings.

In Fig. 3 I show a unit volume cube C supposed to represent $\frac{1}{16}$ of a pint. The edge of this cube has a length H. B is a cylinder of the same volume having an altitude H and a diameter D.

In Fig. 2 I show the side of my scale intended for lineal or depth measurements. The zero graduation is at a distance H from the end of the rule, the 10 graduation at 2H, the 20 graduation at 4H, the 30 graduation at 8H, etc., as is obvious.

In Fig. 1 I show the side of my rule intended for measuring diameters. The zero graduation is at a distance D from the end of the rule, the 20 graduation at 2D, the 40 graduation at 4D, &c.

In using my device to determine the capacity of a cylindrical measure, the diameter of the measure is read on the diameter scale and its depth is read on the depth scale. These two readings are added together and the sum, which is the logarithm of the volume is converted by the use of a suitable table of cologarithms. As the logarithms of all the standard volumetric units will be multiples of 10 these can easily be memorized and recourse to the table will seldom be necessary.

In using my device to determine the capacity of rectangular measures, the length, breadth and depth are read on the depth scale, the three readings are added together and the sum, which is the logarithm of the volume, is converted by the use of the table of cologarithms above mentioned.

While, for convenience, I prefer to mark the depth and diameter scales on the opposite sides of the same rule, the form of the rule is obviously immaterial and if desired the two series of graduations may be placed on separate rules intended for conjoint use in the manner above described.

Having thus described my invention, what I claim is:—

1. A means for measuring volumes comprising in combination two lineal measuring elements each having a different series of logarithmic graduations, the logarithmic base of the two series being the same, one series of graduations expressing the logarithms of lineal distances measured in terms of the length of the edge of a cube of unit volume, and the other series of logarithmic graduations expressing the logarithms of circular areas measured in terms of the diameter of a cylinder of unit volume equal in altitude to the aforesaid cube.

2. A means for measuring volumes comprising in combination two lineal measuring elements each having a different series of logarithmic graduations, the logarithmic base of the two series being such that log. 2=10, one series of graduations expressing the logarithms of lineal distances measured in terms of the length of the edge of a cube of unit volume; and the other series of logarithmic graduations expressing the logarithms of circular areas measured in terms of the diameter of a cylinder of unit volume equal in altitude to the aforesaid cube.

3. A means for measuring volumes comprising in combination two lineal measuring elements each having a different series of logarithmic graduations, the logarithmic base of the two series being such that log. 2=10; one series of graduations expressing the logarithms of lineal distances measured in terms of the length of the edge of a cube of $\frac{1}{16}$ pint volume, and the other series of logarithmic graduations expressing the logarithms of circular areas measured in terms of the diameter of a cylinder of $\frac{1}{16}$ pint volume equal in altitude to the aforesaid cube.

In testimony whereof I have signed my name to this specification in the presence of two subscribing witnesses.

EDWARD D. N. SCHULTE.

Witnesses:
E. A. HAYNER,
GORDON S. HOPKINS.

Copies of this patent may be obtained for five cents each, by addressing the "Commissioner of Patents, Washington, D. C."